May 24, 1932.                S. I. PRESCOTT                1,859,936
                             TIRE RIM AND MOUNT
                             Filed April 25, 1930
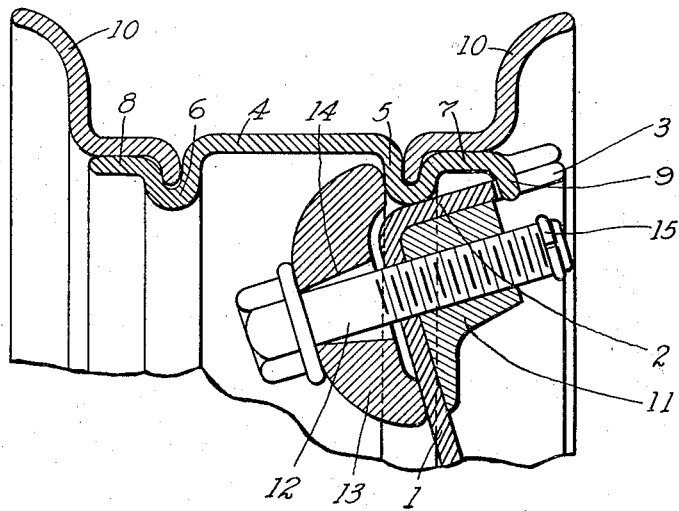
INVENTOR
Sydney I. Prescott Patented May 24, 1932

1,859,936

UNITED STATES PATENT OFFICE

SYDNEY I. PRESCOTT, OF NEW YORK, N. Y.

TIRE RIM AND MOUNT

Application filed April 25, 1930. Serial No. 447,127.

This invention relates to an improved tire rim and mount therefor, consisting in certain combinations and constructions which will be hereinafter fully described and then specifically set forth in the claims hereunto appended, its main object being the production of a cheaper, lighter, stronger, and more easily operated rim and mount for the standardizing wheel disclosed in the co-pending application of Prescott and Rummler, Serial Number 344,282, filed Dec. 12, 1919, and in my co-pending application, Serial Number 219,896, filed Sept. 16, 1927.

In the accompanying drawing, which forms a part of this specification and in which like characters of reference indicate like parts, there is shown a fragmentary cross section of a rim and mount constructed in accordance with the invention, as applied to a wheel of the steel disk type.

In carrying the invention into effect, there is provided a wheel body, and a roadside-demountable rim provided with a continuous ring base seated on the periphery of the body and having two U-shaped inner peripheral ribs, one on either side of the central plane of wheel rotation, and also provided with two quick-detachable tire flanges anchored in said ribs. There is further provided means entirely carried and retained by the body for holding the rim on the body. The term "roadside-demountable rim", as used herein, means a rim which is easily mounted on and demounted from a wheel body as a roadside operation. The terms "split quick-detachable tire flanges" means split rings which are easily sprung in and out of position when changing a tire without demounting the rim from a wheel body, also as a roadside operation.

In the best constructions contemplated, the rim includes a continuous ring base having wings supporting the tire flanges and having a tongue engaging a slot in the periphery of the wheel body whereby it is driven when the wheel is a driver; the ring and tire flanges are rolled from flat stock and are uniform in thickness; and the means for holding the rim on the body includes a nut fast to the inboard side of the body, a bolt working in said nut, a clamp carried by the bolt and engaging the body and the rim, and a device preventing separation of the nut, bolt and clamp to prevent loss of parts affecting rim security when changing rims and tires by the roadside. These various parts may be varied in construction within the scope of the claims, for the particular construction selected to illustrate the invention is but one of numerous possible concrete embodiments of the same. The invention, therefore, is not to be restricted to the precise details of the structure shown and described.

Referring to the drawing: 1 indicates a steel disk wheel body which is provided with an integral conical peripheral rim seat 2 having a slot 3 preferably located at a point diametrically opposite the position of the valve stem of a tire carried by a rim on the body. 4 indicates a continuous ring forming the base of the rim and having inboard and outboard U-shaped inner peripheral ribs respectively marked 5 and 6, and having inboard and outboard wings respectively marked 7 and 8. The inboard wing 7 is provided with a bent tongue 9 projecting into the body slot 3 before referred to. When the wheel is a driver, the engagement of a wall of the slot 3 with the tongue 9 results in driving the rim.

Quick-detachably engaging the wings 7 and 8, and anchored in the ribs 5 and 6, are two like split tire flanges 10, 10, which are held in anchored position by the non-stretchable beads of the tire on the rim, until the outer bead is purposely pushed off the outer tire flange 10 onto the mid-section of the ring 4, so that the outer flange 10 can be lifted out of the outer rib 6 to release the tire from the rim.

For the purpose of holding the rim in position on the body, there is provided a nut 11 secured to the inboard side of the body 1, and in this nut works a bolt 12 which carries a clamp 13 having a tapered hole 14 through which the bolt passes. The clamp engages the body and the rim. A number, preferably an odd number, of like nuts, bolts and clamps are used, five for light cars and seven for heavy cars, although only one is shown.

To prevent separation of the nut, bolt and clamp, a spring ring 15 is provided. This ring engages an annular groove in the bolt 12 adjacent its inboard end, and moves with the bolt.

To demount the rim, it is unnecessary to disturb the clamp opposite the valve stem. The other clamp bolts are backed out a few turns, until the rings 15 engage the nuts 11 and prevent further movement. The clamps will then be clear of the body shoulder, where it turns into the rim seat, and are turned 90 degrees on the bolts to clear the way for demounting the rim. The lower part of the rim is then swung off the body and the whole rim lifted over the undisturbed clamp and thus entirely off the wheel. To mount a substitute rim, it is lifted over the undisturbed clamp with its tongue 9 engaging the body slot 3. Gravity then swings it into its proper place on the body. The released clamps are then swung back into operative position, whereupon a few turns of the bolts locks the rim securely in proper position.

As a result of this construction, the operation of changing rims and tires by the roadside is materially shortened and made easier, and cost is decreased. Rim security is insured because no parts of the rim fastening devices can be lost.

What is claimed is:

1. A tire mount, comprising a wheel body having a rim seat and a slot in said seat, a continuous ring having inboard and outboard U-shaped inner peripheral ribs and wings extending from said ribs, the inboard rib and wing engaging said seat and the inboard wing having a bent tongue projecting into said slot, and means for demountably holding said ring on said seat.

2. A tire mount, comprising a wheel body having a rim seat and a slot in said seat, a continuous ring having inboard and outboard U-shaped inner peripheral ribs and wings extending from said ribs, the inboard rib and wing engaging said seat and the inboard wing having a bent tongue projecting into said slot, and means for demountably holding said ring on said seat, said seat being conical in form, and said inboard rib and wing engaging separated parts of said seat.

3. A tire mount, comprising a wheel body having a rim seat and a slot in said seat, a continuous ring having inboard and outboard U-shaped inner peripheral ribs and wings extending from said ribs, the inboard rib and wing engaging said seat and the inboard wing having a bent tongue projecting into said slot, and means for demountably holding said ring on said seat, said means including a nut secured to the inboard side of said body, a bolt working in said nut, a clamp carried by said bolt and engaging said body and the inboard rib of said ring, and means for preventing separation of said nut, bolt and clamp.

4. A tire rim comprising a continuous ring having inboard and outboard U-shaped inner peripheral ribs and wings extending from said ribs, the inboard rib and wing being adapted to engage a rim seat on a wheel body provided with a slot, and the inboard wing having a bent tongue adapted to engage the slot.

In testimony whereof, I have signed my name to this specification.

SYDNEY I. PRESCOTT.